United States Patent [19]
Finlayson

[11] Patent Number: 5,975,353
[45] Date of Patent: Nov. 2, 1999

[54] FLUID SYSTEM AND METHOD UTILIZING A MASTER AND BLEND RATIO METER

[75] Inventor: Ian Malcolm Finlayson, Salisbury, Md.

[73] Assignee: Dresser Industries, Inc., Dallas, Tex.

[21] Appl. No.: 09/195,798

[22] Filed: Nov. 19, 1998

Related U.S. Application Data

[60] Provisional application No. 60/066,311, Nov. 21, 1997.

[51] Int. Cl.$^6$ ........................................... B67B 7/00
[52] U.S. Cl. .................. 222/26; 222/1; 222/71; 141/9; 141/100; 141/104
[58] Field of Search .................. 222/1, 25, 26, 222/71, 72; 141/9, 100, 104, 105

[56] References Cited

U.S. PATENT DOCUMENTS

| | | | |
|---|---|---|---|
| 3,232,484 | 2/1966 | Young | 222/26 |
| 3,731,777 | 5/1973 | Burke et al. | 222/26 |
| 5,257,720 | 11/1993 | Wulc et al. | 222/20 |
| 5,630,528 | 5/1997 | Nanaji | 222/1 |

*Primary Examiner*—J. Casimer Jacyna
*Attorney, Agent, or Firm*—Haynes and Boone, L.L.P.

[57] ABSTRACT

A fluid system and method according to which a first fluid, a second fluid, or a blend of the fuels is passed to a first meter for measuring the flow thereof while the second fluid is passed through a second meter before it passes to the first meter. The flow of the first fluid to the first meter and the flow of the second fluid to the second meter and then to the first meter are controlled by valves and, as a result, a predetermined ratio of the blended fluids can be established and maintained. The second meter can be calibrated based on the first meter and therefore does not have to inherently provide relatively accurate volumetric measurements. Thus, the second meter can be less costly than the first meter.

18 Claims, 1 Drawing Sheet

5,975,353

FLUID SYSTEM AND METHOD UTILIZING A MASTER AND BLEND RATIO METER

CROSS REFERENCE TO RELATED APPLICATION

This application is based on provisional application S.N. 60/066,311 filed on Nov. 21, 1997.

TECHNICAL FIELD

The invention relates generally to a fluid system and method, and, more particularly, to such a system and method for controlling the flow of two fluids, either individually, or blended together.

BACKGROUND OF THE INVENTION

There are many applications for providing fluids separately and in a blended condition. For example, in connection with service stations for dispensing motor fuel products, two or more fuel products with different octane ratings are dispensed separately, and a blending system is often provided for blending the products. A conventional system of this type utilizes two meters of identical, relatively high, volumetric accuracy so that when either product flows, the required accuracy is available for each product. In these arrangements, when a blended fuel is dispensed, the readings of the two meters are added together to obtain the total volume. The ratio between the two products is obtained and controlled using the two meters, but the volumetric accuracy of each individual meter exceeds the volumetric accuracy requirements of the blended fuel and is costly.

Another problem with prior art arrangements of this type is that the master meter often has a relatively high volumetric capacity. Therefore, when the product to be dispensed is changed, the product that was previously dispensed accumulates in the meter and mixes with the next product to be dispensed. This could cause the quality of the latter product to fall outside regulatory, or other, requirements.

Therefore, what is need is a blending system for two or more fluids which eliminates the need for a relatively costly meter for each fluid. Also needed is a system and method of the above type in which the master meter has a relative low volumetric capacity to avoid the accumulation of any previously dispensed fuel in the meter.

SUMMARY OF THE INVENTION

To this end, according to the fluid system and method of an embodiment of the present invention, a first fluid, a second fluid, or a blend of the fuels is passed to a first meter for measuring the flow thereof while the second fluid is passed through a second meter before it passes to the first meter. The flow of the first fluid to the first meter and the flow of the second fluid to the second meter and then to the first meter are controlled by valves and, as result, a predetermined ratio of the blended fluids can be established and maintained. The second meter can be calibrated based on the first meter and therefore does not have to provide independent, relatively accurate volumetric measurements. As a result, the second meter can be less costly than the first meter.

This results in several advantages since the need for a relatively accurate, and therefore costly, meter for each fluid is eliminated. Also, the first meter can have a relative low volumetric capacity to avoid the accumulation of fuels in the meter during nonuse.

DETAILED DESCRIPTION OF THE PRIOR ART

Figure 1:
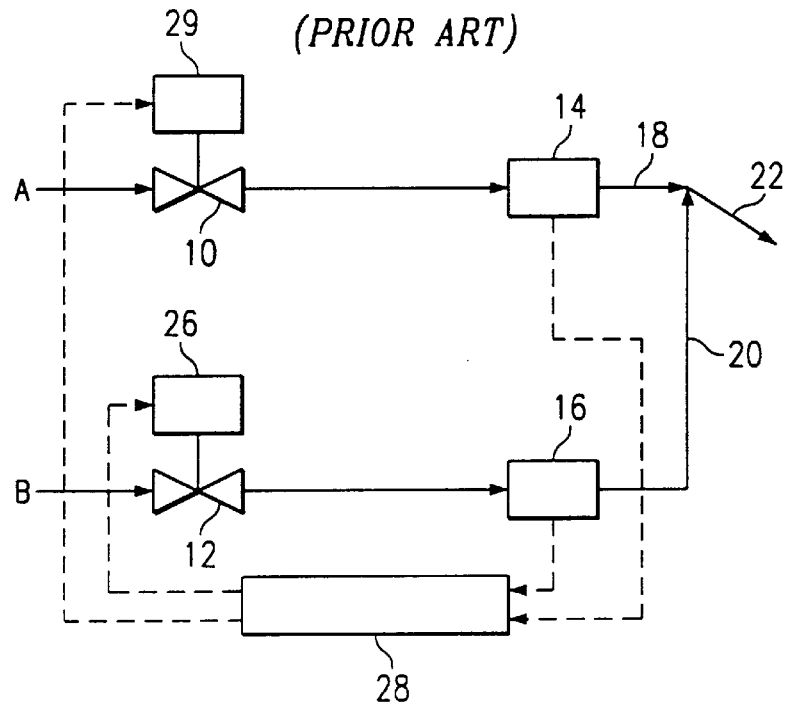
FIG. 1 is a schematic diagram of a fluid control system according to the prior art.
Figure 2:
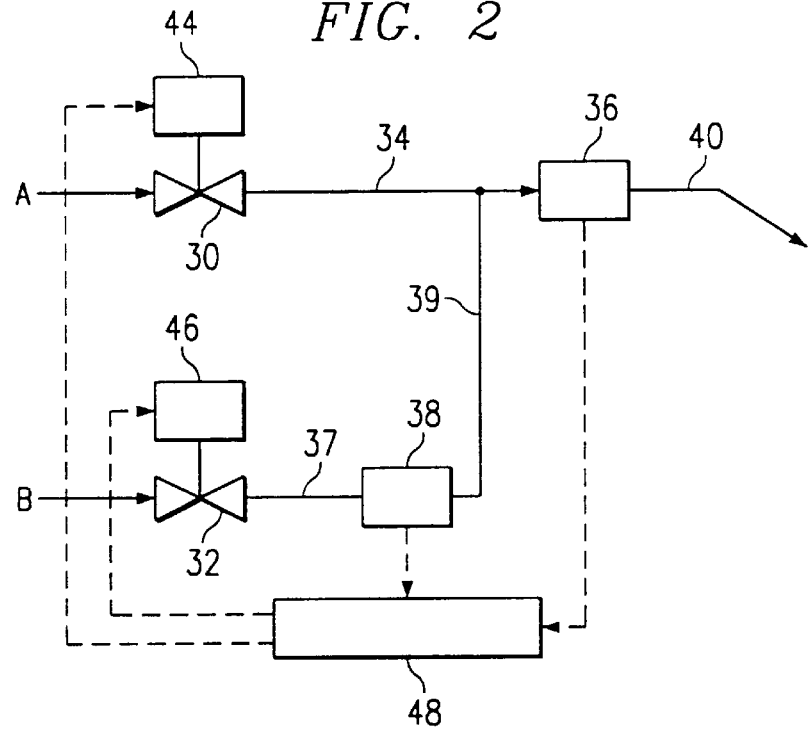
FIG. 2 is a schematic diagram of a fluid control system according to the present invention.

FIG. 1 depicts a typical fluid control system of the prior art, which includes two valves 10 and 12 which respectively receive fluids A and B from separate sources (not shown). The respective inputs of two meters 14 and 16 are connected to the valves 10 and 12, respectively and the outputs of the meters are connected, via lines 18 and 20, respectively, to a conduit, or pipe, 22 in which the fluids are blended.

Two controllers 24 and 26 are respectively connected to the valves 10 and 12 for controlling same, and a ratio control device 28 is connected to the controllers and to the meters 14 and 16. The device 28 responds to an input signal from an external source corresponding to the desired quantity of fluid A and/or fluid B, and controls the valves 10 and 12, accordingly to selectively route the fluids, or a blend thereof, through the valves, the meters 14 arid 16, and to the conduit 22 for dispensing.

In this arrangement, the meters 14 and 16 are identical and each is required to have a relatively high volumetric accuracy. Therefore, when either fluid A or B flows, the required accuracy is available for each fluid, and, when a blended fuel is dispensed, the readings of the two meters are added together to obtain the total volume. The ratio between the two products A and B is obtained and controlled using the two meters 14 and 16 but the accuracy of each individual meter exceeds the blend accuracy requirements and is costly.

Also, the meter 16 often has a relatively high volumetric capacity. Therefore, when the product to be dispensed is changed, the product that was previously dispensed accumulates in the meter and mixes with the next product to be dispensed. This could cause the quality of the latter product to fall outside a desired range.

DETAILED DESCRIPTION OF THE PREFERRED EMBODIMENT

An embodiment of the present invention will be described, for the purpose of example, in connection with a gasoline dispensing system at a service station for vehicles. To this end, pressurized motor fuels A and B, having different octane ratings, are stored in underground storage tanks (not shown) and are supplied to valves 30 and 32, respectively, which are preferably Iccated in a dispensing unit at the service station. It is understood that conduits (not shown) are provided that extend from the storage tanks to the dispensing unit and pumps would be provided to pump the fuels to and through the latter conduits and the valves 30 and 32 under conditions to be described.

A conduit 34 directly connects the valve 30 to the input of a master meter 36, and a conduit 37 connects the valve 32 to the input of a blend ratio meter 38. The output of the meter 38 is connected, via a conduit 39, to the conduit 34 to connect the latter output to the input of the meter 36.

The output of the meter 36 is connected to one end of a conduit 40, and it is understood that the other end of the latter conduit is connect to one end of a hose (not shown). A dispensing nozzle would be connected to the other end of the hose for dispensing the fuels A and B, either individually or blended.

The meter 36 is designed and selected so that it provides a relatively accurate volumetric measurement of the flow therethrough, and the meter 38 can be designed and selected so that it can be calibrated using the meter 36 as a reference and therefore does not have to be as inherently accurate as the meter 36.

Two controllers 44 and 46 are electrically connected to the valves 30 and 32, respectively, for controlling same, and a control device 48, which can be in the form of a microprocessor or electronic computing apparatus, is electrically connected to the controllers and to the meters 36 and 38 as shown by the dotted lines.

It is understood that the above components are associated with a gasoline dispensing unit located at the aforementioned service station which would also be provided with switches, or the like, to enable the customer to select fuel A, fuel B, or a blend of fuels A and B in a predetermined ratio or ratios. The latter switches would be electrically connected to the control device 48 which responds to input signals from the switches and selectively controls the values 30 and 32, and therefore the flow of the fuels A and B accordingly, in a manner to be described.

In operation, both of the valves 30 and 32 are normally closed and, if it the customer selects fuel A, the valve 30 is opened and the valve 32 is maintained in its closed position. Fuel A thus flows through the valve 30, the conduit 34, and the master meter 36. As stated above, the meter 36 is designed and selected to provide an accurate measurement of the total volumetric flow and the meter 38 is calibrated using the meter 36 as a reference.

If fuel B is selected, the valve 32 is opened and the valve 30 remains closed. Fuel B thus flows through the valve 32, the conduit 37, the blend ratio meter 38, the conduit 39, the conduit 34, and to the master meter 36 which again provides a relatively accurate measurement of the total volumetric flow. The meter 38 is not used in this mode since the meter 36 measures the flow.

If the customer selects a fuel corresponding to a blend of the fuels A and B in a predetermined ratio, both of the valves 30 and 32 are opened an amount corresponding to the ratio. Thus, both fuel A and fuel B flow in the manner described above and mix in the conduit 34. The blended fuels then pass from the conduit 34 into the master meter 36 which provides a relatively accurate measurement of the total volumetric flow (VT). In this mode the output signal from the blend ratio meter 38, corresponding to the volumetric flow of fuel B therethrough (VB), should be fairly accurate since the meter 38, although not as inherently accurate as the meter 36, is calibrated using the latter as a reference.

The meters 36 and 38 generate output signals corresponding to the flow of the blended fuel and the fuel B, respectively, which signals are processed in the ratio control device 48. The device 48 varies the respective degrees of openings of the valves 30 and 32 accordingly to maintain the predetermined blend ratio of VB/VT.

The master meter 36 can be designed with a relatively low capacity so that, when a fuel product, or a blended fuel product, passing thermthrough is terminated, it will not accumulate in the meter during nonuse. This is important in connection with gasoline dispensing systems since, otherwise, the accumulated fuel could change the octane rating of the next fuel product to be dispensed causing it to fall outside regulatory, or other, requirements Thus, the fluid control system and method of the present invention enjoy advantages For example, the need for a meter for each fluid that is very accurate, and therefore costly, is eliminated. Also, the meter 36 has a relative low volumetric capacity to avoid the accumulation of any previously dispensed fuel in the meter.

It is understood that variations may be made in the foregoing without departing from the scope of the present invention. For example, the present invention is not limited to use with motor fuel dispensing service stations but can be used any fluid flow control systems, It is understood that other modifications, changes and substitutions are Intended in the foregoing disclosure and in some instances some features of the invention will be employed without a corresponding use of other features. Accordingly, it is appropriate that the appended claims be constrjed broadly and in a manner consistent with the scope of the invention.

What is claimed is:

1. A fluid system comprising a first valve for receiving a first fluid and controlling the flow of the fluid, a second valve for receiving a second fluid and controlling the flow of the second fluid, a first meter connected to the first valve for receiving the first fluid, a second meter connected to the second valve for receiving the second fluid, a conduit connecting the second meter to the first meter for passing the second fluid to the first meter, and a control device for the valves for selectively passing the first fluid, the second fluid, or a blend of the fluids to the first meter for measuring the flow thereof; the second fluid passing through the second meter before passing to the first meter so that the second meter can measure the flow thereof to establish a predetermined ratio of the fluids in the blended fuel.

2. The system of claim 1 where wherein the second meter can be calibrated using the first meter as a standard, and does not have to independently provide relative accurate volumetric measurements of the second fluid passing therethrough.

3. The system of claim 1 wherein the control device controls the ratio of fluids passing to the first meter when both fluids pass to the first meter so that the fluids can be blended in a predetermined ratio.

4. The system of claim 3 wherein the predetermined ratio is established by comparing the flow of the second fluid through the second meter to the total flow of both fluids through the first meter.

5. The system of claim 1 wherein the first meter has a smaller capacity than the second meter to minimize the accumulation of fuels in the first meter during nonuse.

6. The system of claim 1 wherein the fluids are fuels with different octane ratings, and further comprising a conduit connected to the output of the first meter for passing the fuels or a blend of the fuels to a dispensing nozzle for dispensing the fuels into a vehicle.

7. A fluid system comprising a first valve for receiving a first fluid and controlling the flow of the fluid, a second valve for receiving a second fluid and controlling the flow of the second fluid, a first meter connected to the first valve for receiving the first fluid, a second meter connected to the second valve for receiving the second fluid, and a conduit connecting the second meter to the first meter for passing the second fluid to the second meter so that the second meter can measure the flow of only the first fluid, the flow of only the second fluid and the flow of a blend of the first and second fluids, the first meter having a smaller capacity than the second meter to minimize the accumulation of fuels in the first meter during nonuse.

8. The system of claim 7 further comprising a control device connected to the valves and the meters for controlling the valves in response to the flow through the meters.

9. The system of claim 8 wherein the control device controls the valves in a manner so that only one fluid passes to the first meter, so that only the other fluid passes to the first meter, or so that a blend of both fluids passes to the first meter.

10. The system of claim 9 wherein the control device controls the ratio of fluids passing to the first meter when both fluids pass to the first meter so that the fluids can be blended in a predetermined ratio.

11. The system of claim 10 wherein the predetermined ratio is established by comparing the flow of the second fluid through the second meter to the total flow of both fluids through the first meter.

12. The system of claim 7 wherein the fluids are fuels and further comprising a conduit connected to the output of the first meter for passing the fuels or a blend of the fuels to a dispensing nozzle for dispensing the fuels into a vehicle.

13. A fluid control method comprising the steps of selectively passing a first fluid, a second fluid, or a blend of the fluids to a first meter for measuring the flow thereof; passing the second fluid through a second meter before the second fluid passes to the first meter; controlling the flow of the first fluid to the first meter; controlling the flow of the second fluid to the second meter and then to the first meter so that a predetermined ratio of the blended fluids can be established and maintained.

14. The method of claim 13 wherein the first meter inherently provides relatively accurate measurements, and further comprising the step of calibrating the second meter based on the first meter so that the second meter does not have to inherently provide relative accurate volume measurements.

15. The method of claim 13 further comprising the steps of controlling the steps of passing so that only one fluid passes to the first meter, so that only the other fluid passes to the first meter, or so that a blend of both fluids passes to the first meter.

16. The method of claim 15 wherein the step of controlling comprises the step of controlling the ratio of fluids passing to the first meter when both fluids pass to the first meter so that the fluids can be blended in a predetermined ratio.

17. The method of claim 16 wherein the step of controlling comprises the step of establishing the predetermined ratio by comparing the flow of the second fluid to the total flow of both fluids.

18. The method of claim 13 wherein the fluids are fuels and further comprising the step of dispensing the fuels, or a blend of the fuels, into a vehicle.

* * * * *